Dec. 17, 1963  E. LARSON  3,114,436
CAM OPERATED, CALIPER TYPE SPOT BRAKE FOR A ROTATABLE DISC
Filed Aug. 4, 1960
Fig. 1.
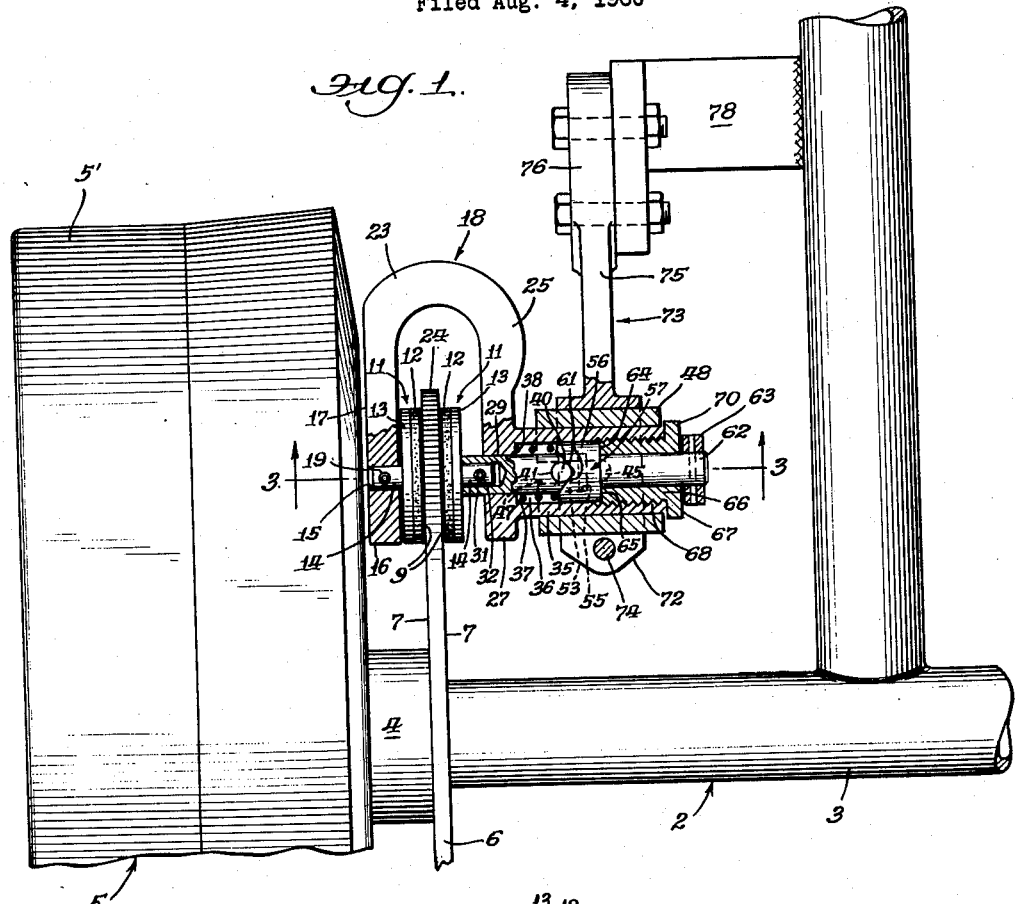
Fig. 2.
Fig. 3
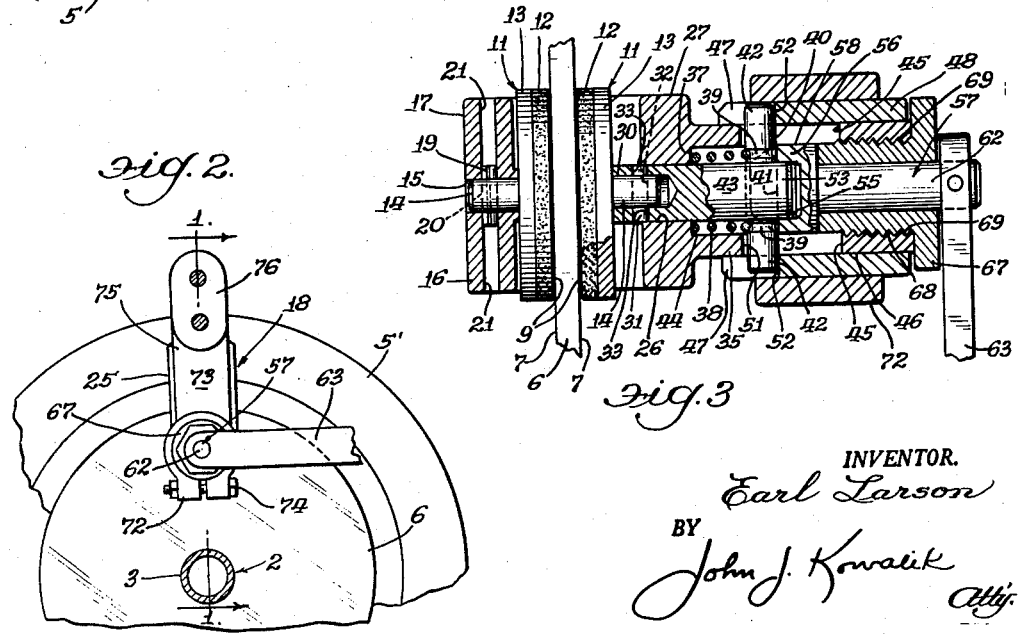
INVENTOR.
Earl Larson
BY
John J. Kowalik
Atty.

United States Patent Office 3,114,436
Patented Dec. 17, 1963

3,114,436
CAM OPERATED, CALIPER TYPE SPOT BRAKE FOR A ROTATABLE DISC
Earl Larson, Glen Ellyn, Ill., assignor to Futora Manufacturing Company, Elmhurst, Ill., a corporation of Illinois
Filed Aug. 4, 1960, Ser. No. 46,612
4 Claims. (Cl. 188—73)

This invention relates to brake means and more specifically to a novel efficient mechanical brake mechanism particularly adapted for application to racing carts though not necessarily restricted thereto.

Brakes currently in use on small carts and racing cars are either of a fixedly mounted radially expandable type or spot brakes applied to the radial sides of a floating brake disc. A common fault is that in general they are too large for small carts and racing cars and when scaled down are prohibitively expensive to make, lose their efficiency, fade out or are quickly destroyed in use.

A primary object of the invention is to devise a brake mechanism which obviates the foregoing faults and deficiencies and which will operate at substantially peak efficiently under extreme conditions.

A corollary object is to devise a novel brake which may be readily mounted on carts and small racing cars in various positions and comprises floatingly mounted brake pads embracing a driving sprocket or disk rotatable with a wheel of the vehicle, the pads being supported from a novel carrier which is adapted to be simply fastened to adjacent structure of the vehicle.

The invention contemplates the provision of a novel braking mechanism which may be removed and replaced in a few minutes by a relatively inexperienced person.

A more specific object of the invention is to provide a novel rotor brake incorporating a rotating element or disc constrained for rotation with a wheel of a vehicle and presenting radial braking sides or faces engaged by a pair of brake shoes which are carried by an equalizer assembly floatingly mounted upon a carrier whereby the shoes are applied to opposite axially aligned areas of the disc under substantially equal pressure and wherein the entire equalizer assembly floats axially with the disc so that the shoes are self-positioning or self-aligning and tolerate substantial variations in the disposition of the disc, with respect to the support mounting the shoes.

A more specific object of the invention is the provision of brake shoes of novel construction which are adapted to withstand the high heat momentarily generated between the disc and the shoes pursuant to a braking application, the shoes being composed of sintered bronze impregnated with ceramic and brazed to a metallic backing.

These and other objects and advantages inherent in and encompassed by the invention will become more readily apparent from the specification and the drawings, wherein:

FIGURE 1 is a rear elevational view partially in section taken essentially on the line 1—1 of FIGURE 2 of the novel brake mechanism applied to a racing vehicle fragmentarily shown;

FIGURE 2 is a side elevational view of the structure shown in FIGURE 1; and

FIGURE 3 is an axial sectional view of the mechanism taken substantially on line 3—3 of FIGURE 1.

Describing the invention in detail and having particular reference to the drawings, there is fragmentarily shown in FIGURE 1 a vehicle frame 2 including a transverse axle frame element 3 which rotatably journals a hub 4 of a wheel 5 which carries a tire 5'.

The hub 4 is fixedly connected to a brake element 6 which may be an annular disc or driving sprocket presenting a pair of radial substantially flat brake faces 7 and 7 at opposite sides which are adapted to be engaged by the opposing generally flat faces 9 and 9 respectively of the identical brake shoe assemblies 11, 11 each of which comprises a shoe 12 composed of sintered bronze impregnated with ceramic material, the shoe being brazed to a metallic backing plate 13 which comprises a central axially extending pin 14.

The pin 14 of the left brake assembly 11 as seen in FIGURE 1, extends into a complementary aperture 15 in the distal end 16 in the outer leg 17 of a U-shaped carrier or equalizer 18. The pin 14 of the left assembly is secured to leg 17 by a resilient pin 19 which extends through aligned transverse openings 20 in pin 14 and 21, 21 in leg 17, openings 21 intersecting opening 15. Leg 16 is integral with the bight portion 23 which extends over the periphery 24 of disk 6 and connects to a radially inwardly projecting leg 25 which opposes and parallels leg 17 but is located at the opposite side of disk 6. Leg 25 is provided with opening 26 in its distal end 27, opening 26 extending axially of the disc 6 and mounting push rod 29 which has an axial bore 30 receiving pin 14 of the right brake assembly 11 as seen in FIGURE 1, the pin 14 being connected to the rod or actuator 29 by a transverse resilient pin 31 which extends through transverse aligned openings 32 in pin 14 and 33, 33 in actuator 29.

The actuator 29 is reciprocal in opening 26 and at its inner end projects into a sleeve 35 which is integral with the free end 27 of leg 25 and extends away from disc 6 coaxially with the push rod 29 and provides a bore 36 which terminates at leg 25 in a seat 37 for one end of a compression or return spring 38 which is sleeved over rod 29 and seats at one end against seat 37 and at its other end enters peripheral notches 39, 39 in a cam pin 40 which extends through a transverse opening 41 in the rod 29.

The cam pin 40 has opposite end portions 42, 42 outwardly of notches 39 which are located in pin 40 between the periphery 43 of the actuating pin 29 and the internal periphery 44 of the sleeve 35. The notches 39 serve not only to position the spring 38 but also to lock the pin against axial displacement whereby the cam pin is centered and its end portions 42 are located in the axially elongated slots 45, 45 in sleeve 35 and have their outermost lengths projecting equally outwardly from the outer periphery 46 of the sleeve 35 into the axially elongated notches 47, 47 in the retainer and guide sleeve 48. The notches 47 provide substantially parallel axially extending sides and are open ended at the inner edge of sleeve 48 to permit assembly and disassembly of the brake unit with respect thereto. The cam pin is guided axially toward and away with respect to the disk 6 and in unbraked position has its end portions 42 spaced at one side away from the ends 51, 51 of the slots 45 and at their diametrically opposite sides seating against the closed ends 52, 52 of slots 47, 47.

The innermost end 53 of the push rod 29 is piloted in a bore 55 in an enlarged head 56 on the inner end of a camming element generally designated 57, the head being generally cylindrical and having an outer periphery 58 snugly fitting into the bore 36 and having on its inner edge a V-shaped axially indented cam profile providing a pocket admitting the cam pin transaxially therein and providing wedging or cam faces 61, 61 (FIGURE 1) which upon the application of torques or turning movement to the shaft portion 62 of the wedge element 57, as it is rotated by an arm 63 fixed thereto, causes the cam pin to wedge out of the pocket as the back side or shoulder 64 of the head of the cam member reacts against the inner end 65 of the ferrule portion 66 of an adjusting nut 67 which has its ferrule portion externally threaded at 68 into the threads 69 on the interior of the sleeve 35.

The adjusting nut 67 has an outturned flange portion 70 at its outer end which overlaps sleeve 35 as well as the retainer sleeve 48 which fits into a jaw portion 72 formed on one end of a hanger or mount 73. The jaw portion 72 is snugged about sleeve 48 by a nut and bolt assembly 74 which extends through and draws the jaw portions together, the jaw portion 72 is integrated with the shank portion 75 of hanger 73 which has an apertured mounting pad 76 at its other end secured by bolts or the like to an adjacent portion 78 of the vehicle frame.

In operation, assuming that the brakes are in released position, the operator actuates the lever arm 63 which is fastened to the shaft 62. Arm 63 may be rotated in either direction thus concurrently rotating the wedge head 56 and urging the pin 40 toward the disk 6 and thus moving the right shoe assembly 11 leftwardly engaging shoe 12 with the right side 7 of disk 6. Simultaneously shoulder 65 reacts against the nut 67 urging it rightwardly and since it is connected to the sleeve 35 it also moves rightwardly moving the equalizer 18 therewith and through leg 17 moving the left shoe into engagement with the left side 7 of disk 6.

It will be appreciated that the holding sleeve 48 is adjustable axially of the brake disc so that an optimum position can be determined by trial and the device locked in place.

I claim:

1. In a brake, a rotor having a pair of substantially radial braking surfaces, a mounting equalizer having interconnected generally radially extending first and second portions disposed adjacent to respective surfaces and an extension from one of said portions projecting axially from said rotor, a first brake shoe on the first portion adjacent to the respective surface and movable by and with said equalizer to applied and released positions with respect to the associated surface, a second brake shoe adjacent to the second portion, a member movable within the extension and connected to the second shoe, a pin extending through said member and presenting a reaction surface, said extension having axial slots receiving portions of the pin therethrough accommodating relative axial movement with said member in a direction opposite to said extension and preventing relative rotation therebetween, a support slidably mounting said extension for axial movement therein, said pin having end portions projecting into axial slots in said support, and actuating means reacting between said reaction surface and the extension for operating the second shoe directly and moving the equalizer to operate the shoe on said first portion.

2. In a brake arrangement, the combination of a pair of opposed brake shoes, mounting means supporting said shoes, said means having telescoping portions extending substantially normal to the shoes, one of said portions having a transverse part and the other portion having axially elongated slots receiving said part, said part having ends projecting beyond the other portion, support means slidably mounting said other portion for axial movement and having axial slots receiving the ends of said part therein, actuating means rotatably carried by said other portion and including cam means telescoped with said other portion and reactive between said other portion and said transverse part.

3. In a brake, a rotating brake member, a support adjacent the member, a sleeve mounted thereon for adjustment toward and away with respect to the brake member, an equalizer having a portion axially movable within said sleeve, cam means rotatable within said portion and reactive thereagainst for moving the same in one direction, a cammed member having means cooperative with the cam means for movement thereby and in an opposite direction to the equalizer and coincidental with the movement thereof in said one direction, a shoe carried by the cammed member at one side of the brake member for engagement therewith, and a shoe carried by the equalizer opposite to the first-mentioned shoe and means interlocking the cammed member with said equalizer portion and support against relative rotation and accommodating axial movement of the equalizer with respect to the support and the equalizer and cammed member in axially opposite directions, and release means between said interlocking means and said equalizer portion operative in opposition to the cam means.

4. In a brake, a rotor, a pair of shoes at the opposite sides of the rotor, an actuating mounting structure comprising a pair of telescoping portions, one portion supporting one shoe and the other portion the other shoe, a transverse element extending through said other portion, said one portion and structure having slots extending axially of the rotor admitting said element therein, actuating means mounted on said structure and operative to relatively move said other portion and thus said other shoe and said one portion and thus the one shoe to engaged and disengaged positions relative to said rotor, said structure mounting said element for movement axially of the rotor in accordance with axial movements of the rotor during braking application, and brake release resilient means interposed between said element and said one portion urging said portions to positions disengaging the shoes from the rotor.

References Cited in the file of this patent

UNITED STATES PATENTS

| | | |
|---|---|---|
| 1,142,880 | Hartman | June 15, 1915 |
| 1,320,590 | Waters | Nov. 4, 1919 |
| 2,408,430 | Lowey et al. | Oct. 1, 1946 |
| 2,612,968 | Hood | Oct. 7, 1952 |
| 2,770,333 | Smith | Nov. 13, 1956 |
| 2,827,986 | Casey et al. | Mar. 25, 1958 |
| 2,862,581 | Lucien | Dec. 2, 1958 |
| 2,924,301 | Durst et al. | Feb. 9, 1960 |
| 3,052,326 | Baisch | Sept. 4, 1962 |